(12) United States Patent
Lin et al.

(10) Patent No.: US 8,669,507 B2
(45) Date of Patent: Mar. 11, 2014

(54) LASER SCANNING DEVICE

(75) Inventors: Yu-Chung Lin, Tainan County (TW);
Min-Kai Lee, Tainan County (TW);
Sung-Ho Liu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 213 days.

(21) Appl. No.: 13/305,887

(22) Filed: Nov. 29, 2011

(65) Prior Publication Data

US 2012/0097834 A1    Apr. 26, 2012

Related U.S. Application Data

(63) Continuation-in-part of application No. 12/975,556, filed on Dec. 22, 2010.

(30) Foreign Application Priority Data

Oct. 22, 2010   (TW) .............................. 99136213 A
Oct. 19, 2011   (TW) .............................. 10137979 A

(51) Int. Cl.
*G01J 1/20*    (2006.01)
*G02B 26/10*   (2006.01)
*B23K 26/04*   (2006.01)

(52) U.S. Cl.
USPC ............ 250/201.1; 250/236; 359/205.1; 372/24; 219/121.83

(58) Field of Classification Search
USPC ............ 250/201.1, 201.2, 201.4, 201.8, 216, 250/234, 235, 236, 208.1; 359/205.1, 683, 359/691, 692; 372/24, 25; 219/121.6, 219/121.78, 121.8, 121.83; 348/67, 90, 94, 348/95, 135
See application file for complete search history.

(56) References Cited

U.S. PATENT DOCUMENTS 4,626,673 A * 12/1986 Struye ..................... 250/201.4
5,185,676 A    2/1993 Nishiberi
(Continued)

FOREIGN PATENT DOCUMENTS

CN    101019058 A    8/2007
TW    I227814 B      2/2005
(Continued)

OTHER PUBLICATIONS

Taiwan Patent Office, Office Action, Patent Application Serial No. TW100137979, Sep. 17, 2013, Taiwan.

(Continued)

*Primary Examiner* — John Lee
(74) *Attorney, Agent, or Firm* — Rabin & Berdo, P.C.

(57) ABSTRACT

A laser scanning device includes a laser output unit, a scanner, a light splitting unit, an imaging compensation unit, a detection unit, and a control unit. A scanning focusing unit included in the scanner focuses a laser beam emitted by the laser output unit to scan an object. A visible light beam received by the canning focusing unit is reflected by the light splitting unit and is incident into the imaging compensation unit. Next, the detection unit receives the visible light beam passing through the imaging compensation unit, and outputs a detection signal. The control unit adjusts the detection signal according to the wavelength of the visible light beam, the wavelength of the laser beam, the scanning focusing unit, and the imaging compensation unit. Therefore, the laser scanning device may compensate the aberration and the dispersion caused when the visible light beam passes through the scanning focusing unit.

14 Claims, 11 Drawing Sheets

(56) References Cited

U.S. PATENT DOCUMENTS

| | | | |
|---|---|---|---|
| 5,286,964 A * | 2/1994 | Fountain | 250/201.2 |
| 5,338,924 A * | 8/1994 | Barrett et al. | 250/201.4 |
| 5,562,842 A * | 10/1996 | Laferriere | 219/121.83 |
| 5,602,079 A * | 2/1997 | Takenaka et al. | 505/310 |
| 6,303,903 B1 * | 10/2001 | Liu | 219/121.83 |
| 6,404,530 B1 | 6/2002 | Takeuchi | |
| 6,501,061 B1 * | 12/2002 | Kitai et al. | 250/205 |
| 6,541,747 B1 * | 4/2003 | Kikuchi et al. | 250/201.2 |
| 6,545,250 B2 | 4/2003 | Hartmann et al. | |
| 6,621,060 B1 * | 9/2003 | Nantel et al. | 250/201.4 |
| 6,624,403 B2 * | 9/2003 | Chen et al. | 250/201.2 |
| 6,649,893 B2 * | 11/2003 | Fujimoto et al. | 250/201.2 |
| 6,653,611 B2 * | 11/2003 | Eckelkamp-Baker et al. | 250/201.1 |
| 6,670,574 B1 * | 12/2003 | Bates et al. | 219/121.64 |
| 7,402,774 B2 * | 7/2008 | Kitai et al. | 219/121.8 |
| 7,547,866 B2 * | 6/2009 | Tanaka et al. | 250/201.2 |
| 7,777,210 B2 * | 8/2010 | Tanaka et al. | 250/559.3 |
| 7,915,564 B2 * | 3/2011 | Kaplan et al. | 219/121.68 |
| 7,994,467 B2 * | 8/2011 | Fushman et al. | 250/216 |
| 2002/0166945 A1 * | 11/2002 | Tadano et al. | 250/201.1 |
| 2004/0026389 A1 * | 2/2004 | Kessler et al. | 219/121.83 |
| 2004/0089642 A1 * | 5/2004 | Christensen et al. | 219/121.69 |
| 2005/0006573 A1 * | 1/2005 | Dollmann et al. | 250/234 |
| 2005/0263507 A1 * | 12/2005 | Yamazaki et al. | 219/121.83 |
| 2006/0011592 A1 * | 1/2006 | Wang et al. | 219/121.64 |
| 2006/0054608 A1 * | 3/2006 | Cahill et al. | 219/121.83 |
| 2006/0124617 A1 * | 6/2006 | Hsu | 219/121.67 |
| 2007/0164194 A1 * | 7/2007 | Kurata et al. | 250/201.4 |
| 2007/0253057 A1 * | 11/2007 | Potsaid et al. | 359/384 |
| 2008/0191121 A1 * | 8/2008 | Yoo et al. | 250/201.4 |
| 2009/0040299 A1 * | 2/2009 | Harrison et al. | 348/135 |
| 2009/0218475 A1 * | 9/2009 | Kawakami et al. | 250/201.1 |
| 2009/0278058 A1 * | 11/2009 | Kim et al. | 250/492.1 |
| 2011/0193269 A1 * | 8/2011 | Ito et al. | 264/400 |
| 2012/0097833 A1 * | 4/2012 | Lin et al. | 250/201.1 |
| 2012/0097834 A1 * | 4/2012 | Lin et al. | 250/201.1 |

FOREIGN PATENT DOCUMENTS

| | | |
|---|---|---|
| TW | I255749 B | 6/2006 |
| TW | I277478 B | 4/2007 |
| TW | 200800458 A | 1/2008 |
| WO | WO-2009054811 A1 | 4/2009 |

OTHER PUBLICATIONS

Stache el al., Automatic Calibration of a Scanner-Based Laser Welding System, International Congress on the Applications of Lasers and Electro-Optics, Oct. 29, 2007, pp. 223-229.

Stache el al., Robust Circle Fitting in Industrial Vision for Process Control of Laser Welding, Proceedings of the 11th International Student Conference on Electrical Engineering POSTER, May 17, 2007.

Fang et al., Coaxial monitoring with a CMOS camera for C02 laser welding.

* cited by examiner

LASER SCANNING DEVICE

CROSS-REFERENCE TO RELATED APPLICATION

This non-provisional application claims priority under 35 U.S.C. §119(a) on Patent Application No. 100137979 filed in Taiwan, R.O.C. on Oct. 19, 2011, and is a continuation-in-part patent application of U.S. application Ser. No. 12/975,556 filed on Dec. 22, 2010, which itself claims priority on Patent Application No. 099136213 filed in Taiwan, R.O.C. on Oct. 22, 2010, the entire contents of which are hereby incorporated by reference.

BACKGROUND OF THE INVENTION

1. Field of Invention

The present invention relates to a laser scanning device, and more particularly to a laser scanning device capable of compensating the aberration and the dispersion which are caused when the visible light beam passes through a scanning focusing unit.

2. Related Art

Laser processing technology is a method for scanning an object with a laser beam and generating a mark. In the industry, many types of lasers are used in processing, for example, carbon dioxide laser, semiconductor laser, and diode laser.

A production line of a conventional laser processing flow mainly is divided into three blocks, in which a first block is a positioning region, a second block is a processing region, and a third block is a detection region. However, before laser processing, the production line first performs a positioning process in the positioning region by using a charge couple device (CCD), then performs laser processing in the processing region, and finally performs a detection process in the detection region by using a CCD. The above-mentioned laser processing needs three CCDs and a laser scanning device, and thus the problems that many components are needed, a large space is occupied, and synchronous detection cannot be achieved exist.

Moreover, currently, the conventional laser scanning and detection devices on the market are all designed for the scanning of a central position, such that the images obtained at the central area are clear, while the images obtained at non-central areas are blurred. Further, when the scanning angle of the conventional laser scanning device with respect to a platform is not orthogonal (that is, an angle formed by the laser beam and an optical axis of a scanning mirror is not 45 degrees), as the wavelengths of the laser beam and the visible light beam are different, after the visible light beam passes through the scanning mirror, a dispersion is caused, and thus the position actually scanned by the laser beam is different from the scanning processing position where the CCD receives the visible light beam to obtain the image, so that the accuracy of the detection process is affected.

SUMMARY

Accordingly, the present invention is a laser scanning device, which solves the problems in the prior art that many components are needed, a large space is occupied, synchronous detection cannot be achieved, merely images at the central region are clear, and the position actually scanned by the laser beam is different from the scanning processing position where the CCD receives the visible light beam to obtain the image, which affects the detection accuracy.

The present invention provides a laser scanning device, which is applicable in scanning an object disposed on a working platform. The laser scanning device comprises a laser output unit, a scanner, a light splitting unit, an imaging compensation unit, a detection unit, and a control unit. The scanner comprises a scanning focusing unit. The laser output unit outputs a laser beam, the scanning focusing unit focuses the laser beam to scan the object, and the scanner receives a visible light beam irradiated on the object by the scanning focusing unit and outputs the visible light beam. Next, the light splitting unit lets the laser beam pass through and reflects the visible light beam output by the scanner. The imaging compensation unit receives the visible light beam reflected by the light splitting unit and compensates an aberration which is caused when the visible light beam passes through the scanning focusing unit. Thereafter, the detection unit receives the visible light beam that passes through the imaging compensation unit and outputs a detection signal. The control unit receives the detection signal, and adjusts the detection signal according to a wavelength of the visible light beam, a wavelength of the laser beam, the scanning focusing unit, and the imaging compensation unit.

According to the laser scanning device of the present invention, the detection unit is disposed to eliminate the problems in the prior art that many components are needed, a large space is occupied, and synchronous detection cannot be achieved. Next, as the scanning focusing unit is designed according to the laser beam, and the wavelengths of the visible light beam and the laser beam are different, when the visible light beam passes through the scanning focusing unit, an aberration is caused, and by means of the design of the imaging compensation unit, the aberration caused after the visible light beam passes through the scanning focusing unit is compensated, to solve the problem in the prior art that merely images at the central region are clear. Moreover, as the visible light beam comprises multiple wavelengths, when the visible light beam passes through the scanning focusing unit, a dispersion is caused, and by adjusting the detection signal by the control unit, the dispersion caused after the visible light beam passes through the scanning focusing unit is compensated, to solve the problem in the prior art that the position actually scanned by the laser beam is different from the scanning processing position where the CCD receives the visible light beam to obtain the image, which affects the detection accuracy.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
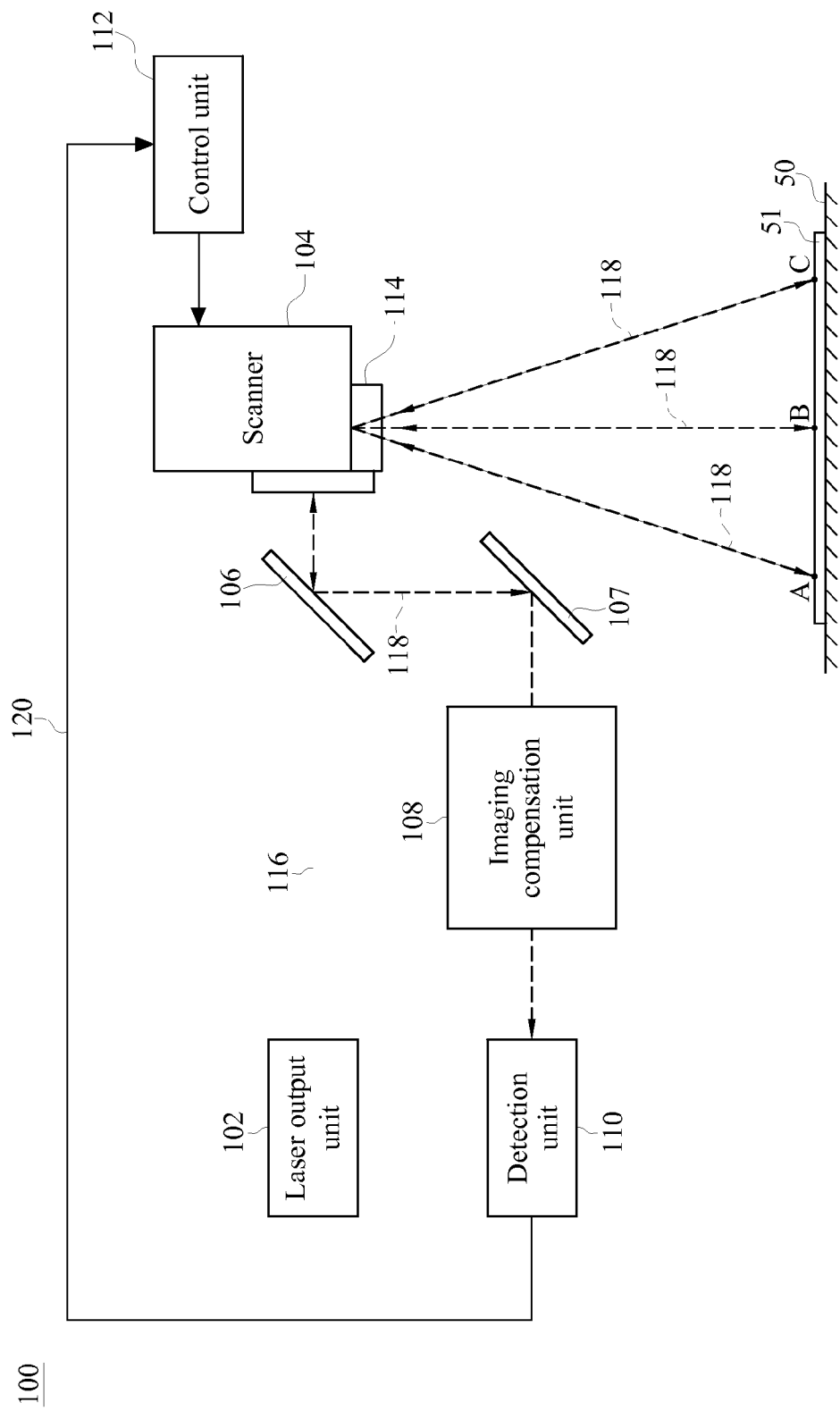
FIG. 1 is a schematic architectural view of an embodiment of a laser scanning device according to the present invention.

FIG. 1 is a schematic architectural view of an embodiment of a laser scanning device according to the present invention. Referring to FIG. 1, a laser scanning device 100 is applicable in scanning an object 51 disposed on a working platform 50. The object 51 comprises a positioning point A, a positioning point B, and a positioning point C, in which the positioning point B is disposed between the positioning point A and the positioning point C, and the positioning point B is a center point of the object 51. In this embodiment, the positioning point B is focused by the laser scanning device 100. The positioning point A and positioning point C are defocused by the laser scanning device 100, respectively. A distance of the image of the positioning point A from a focus of the laser scanning device 100 is, but not limited to, about 300 μm (micrometer) to 2000 μm, and a distance of the image of the positioning point C from the focus of the laser scanning device 100 is, but not limited to, about 300 μm (micrometer) to 2000 μm. The laser scanning device 100 comprises a laser output unit 102, a scanner 104, a light splitting unit 106, a reflecting element 107, an imaging compensation unit 108, a detection unit 110, and a control unit 112. In this embodiment, the scanner 104 may comprise a scanning element 40 (referring to FIG. 2A) and a scanning focusing unit 114. The scanning focusing unit 114 may comprise, but is not limited to, a lens 42, a lens 43, a lens 44, and a lens 45 (referring to FIG. 2A).

The laser output unit 102 outputs a laser beam 116. In this embodiment, the wavelength of the laser beam 116 may be, but is not limited to, 100 nanometers (nm) to 100 micrometers (μm). After passing through the light splitting unit 106, the laser beam 116 is incident into the scanner 104. The scanning focusing unit 114 focuses the laser beam 116 to scan the object 51 on the working platform 50. After the laser scanning device 100 finishes the scanning process, the scanner 104 receives a visible light beam 118 (that is, a visible light beam 118 of the positioning point A, the positioning point B, and the positioning point C included in the object 51) irradiated on the working platform 50 and outputs the visible light beam 118 to the light splitting unit 106 through the scanning focusing unit 114. Next, the light splitting unit 106 reflects the visible light beam 118 output by the scanner 104. The imaging compensation unit 108 receives the visible light beam 118 reflected by the light splitting unit 106 and the reflecting element 107, and compensates the aberration and the dispersion caused when the visible light beam 118 passes through the scanning focusing unit 114 (as shown in FIG. 2A).

A light source (not shown) of the visible light beam 118 that is irradiated on the working platform 50 may be an external light source added to the laser scanning device 100, but the present invention is not limited thereto. For example, the light source of the visible light beam 118 that is irradiated on the working platform 50 may be a visible light source disposed in the scanner 104.

The generation of the aberration and the dispersion is related to the design of the scanning focusing unit 114. As the scanning focusing unit 114 is designed according to the wavelength of the laser beam 116, to focus the laser beam 116 for scanning after passing through the scanning focusing unit 114; however, the wavelength of the visible light beam 118 is different from the wavelength of the laser beam 116, so that when the visible light beam 118 passes through the scanning focusing unit 114, the aberration and the dispersion are caused.

Figure 2A:
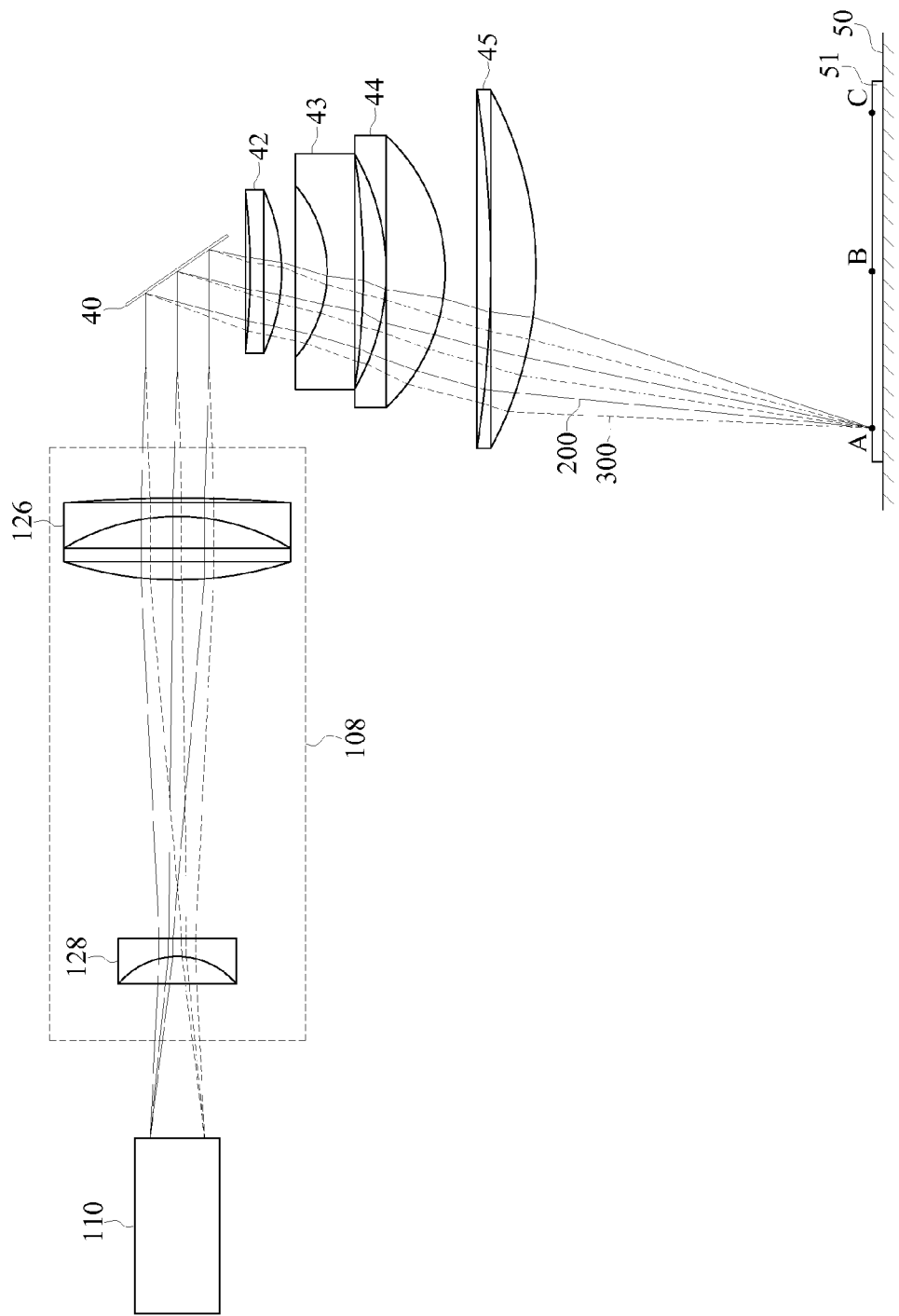
FIG. 2A is a light path diagram that a scanner in FIG. 1 receives a visible light beam irradiated on a positioning point A of a working platform and outputs the visible light beam.
Figure 2B:
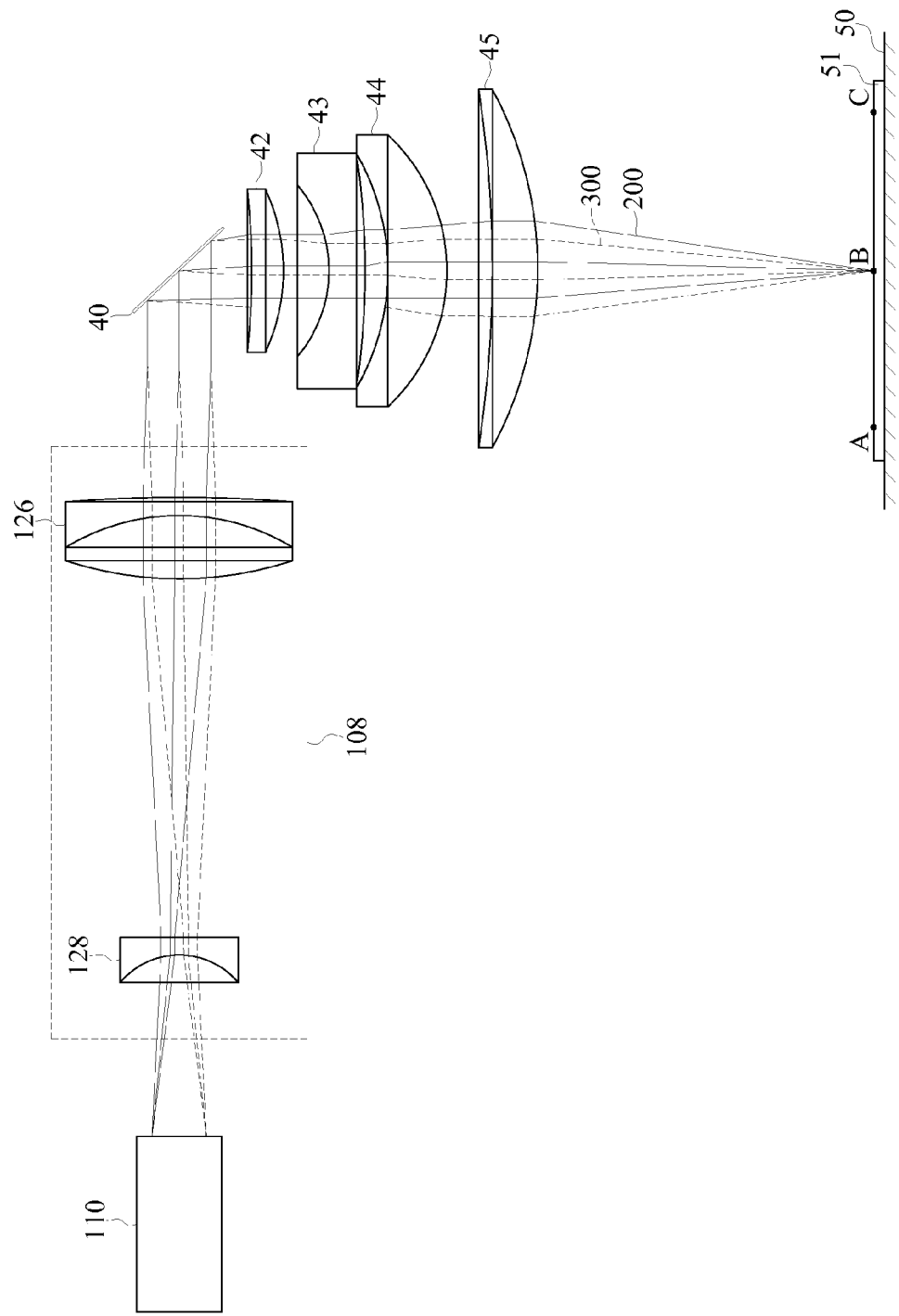
FIG. 2B is a light path diagram that the scanner in FIG. 1 receives a visible light beam irradiated on a positioning point B of the working platform and outputs the visible light beam.
Figure 2C:
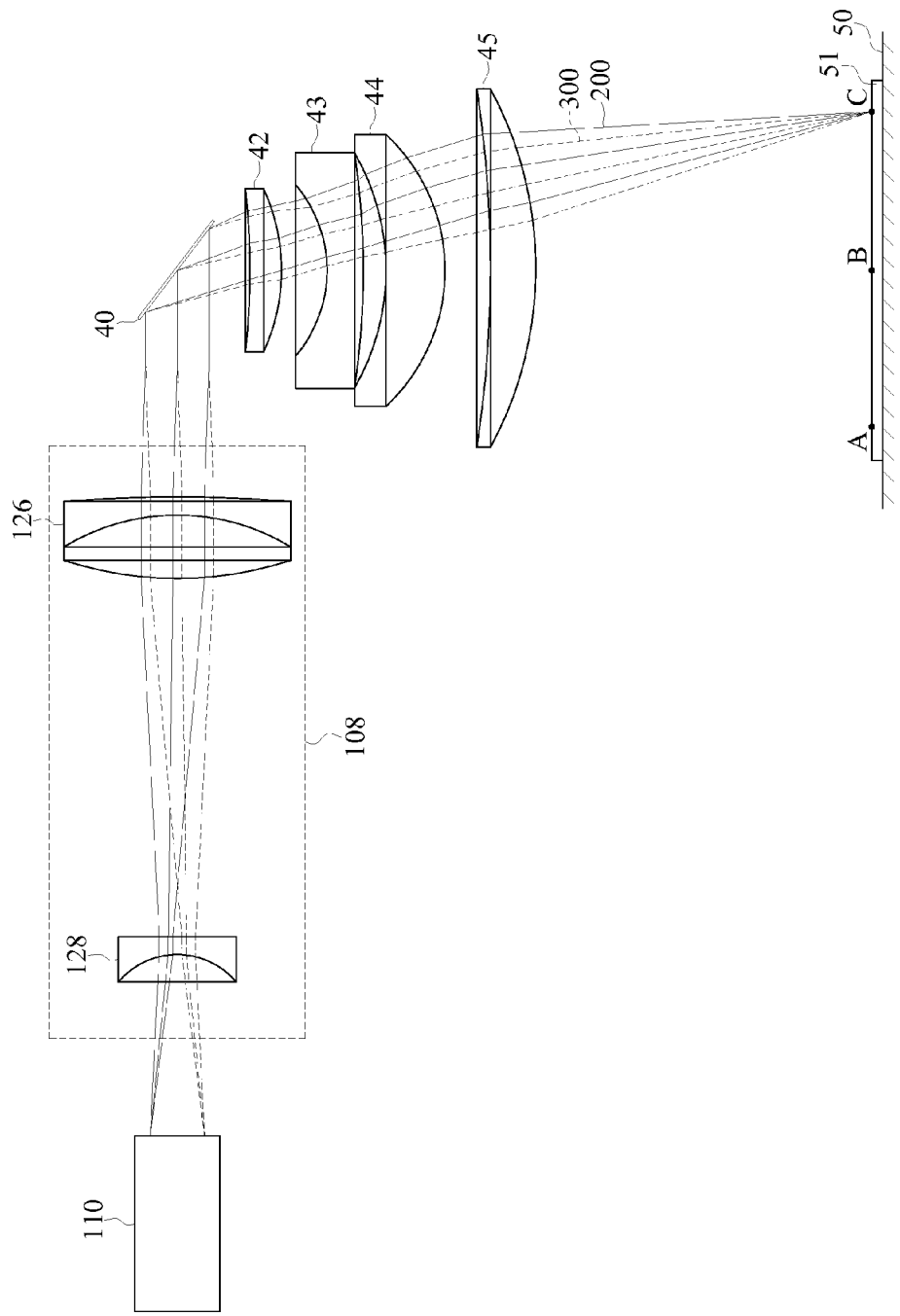
FIG. 2C is a light path diagram of the scanner in FIG. 1 receives a visible light beam irradiated on a positioning point C of the working platform and outputs the visible light beam.

More particularly, FIGS. 2A, 2B, and 2C are light path diagrams that the scanner in FIG. 1 receives visible light beams irradiated on the positioning point A, the positioning point B, and the positioning point C of the working platform and outputs the visible light beams. In this embodiment, the scanner 104 (referring to FIG. 1) comprises at least one scanning element 40 and the scanning focusing unit 114. The scanning focusing unit 114 may comprise, but is not limited to, the lens 42, the lens 43, the lens 44, and the lens 45. The visible light beam 118 (referring to FIG. 1) comprises, but is not limited to, a red light beam 200 and a green light beam 300, such that after the red light beam 200 and the green light beam 300 respectively pass through the scanning focusing unit 114 (that is, the scanning element 40, the lens 42, the lens 43, the lens 44, and the lens 45), as the wavelengths of the red light beam 200 and the green light beam 300 are different from the wavelength of the laser beam 116 (referring to FIG. 1), the refractive indexes of the scanning focusing unit 114 respectively corresponding to the red light beam 200, the green light beam 300, and the laser beam 116 (referring to FIG. 1) are different, resulting in the aberration and the dispersion (that is, before the red light beam 200 and the green light beam 300 in FIGS. 2A, 2B, and 2C enter the imaging compensation unit 108, the red light beam 200 irradiated on the positioning point A, the positioning point B, or the positioning point C is not focused into one point, and the green light beam 300 irradiated on the positioning point A, the positioning point B, or the positioning point C is not focused into one point, such that the images at the positioning point A, the positioning point B, and the positioning point C are blurred, and the aberration is caused). Therefore, the imaging compensation unit 108 is disposed, such that after each wavelength of the visible light beam 118 (referring to FIG. 1) passes through the imaging compensation unit 108, the aberration and the dispersion are eliminated. The elimination of the aberration by the imaging compensation unit 108 is described in detail below.

Referring to FIG. 1, the laser beam 116 output by the laser output unit 102 passes through the light splitting unit 106, the scanning element 40, the lens 42, the lens 43, the lens 44, and the lens 45 to scan the object 51, and the visible light beam 118 irradiated on the object 51 passes through the lens 45, the lens 44, the lens 43, the lens 42, the scanning element 40, the light splitting unit 106, the reflecting element 107, and the imaging compensation unit 108 to be received by the detection unit 110.

Figure 3:
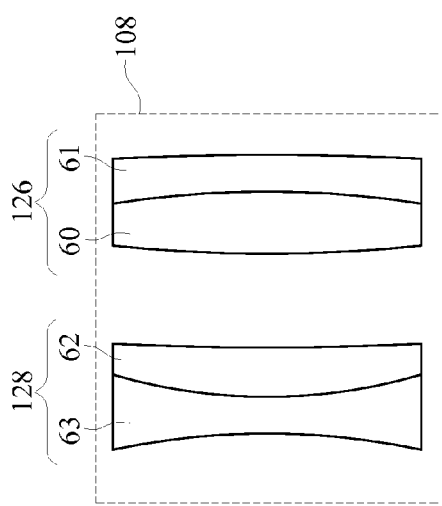
FIG. 3 is a schematic structural view of an embodiment of an imaging compensation unit in FIG. 1.

FIG. 3 is a schematic structural view of an embodiment of an imaging compensation unit in FIG. 1. In this embodiment, the imaging compensation unit 108 may comprise a positive lens group 126, and the positive lens group 126 may comprise, but is not limited to, a lens 60 and a lens 61. Furthermore, in order to shorten the distance between the reflecting element 107 and the detection unit 110, the imaging compensation unit 108 may further comprise a negative lens group 128, and the negative lens group 128 may comprise, but is not limited to, a lens 62 and a lens 63. The positive lens group 126 and the negative lens group 128 satisfy the following formulas (1) and (2) respectively:

$$r_2 - r_1 > r_1 \cdot r_2 \quad (1)$$

$$r_3 - r_4 \leq r_3 \cdot r_4 \quad (2)$$

In the formulas, $r_1$ is a first radius of curvature of the positive lens group 126, $r_2$ is a second radius of curvature of the positive lens group 126, $r_3$ is a third radius of curvature of the negative lens group 128, and $r_4$ is a fourth radius of curvature of the negative lens group 128. That is to say, $r_1$ may be a radius of curvature of a left edge formed by combining the lens 60 and the lens 61 in FIG. 3, $r_2$ may be a radius of curvature of a right edge formed by combining the lens 60 and the lens 61 in FIG. 3, $r_3$ may be a radius of curvature of a left edge formed by combining the lens 62 and the lens 63 in FIG. 3, and $r_4$ may be a radius of curvature of a right edge formed by combining the lens 62 and the lens 63 in FIG. 3, but the present invention is not limited thereto.

Figure 4:
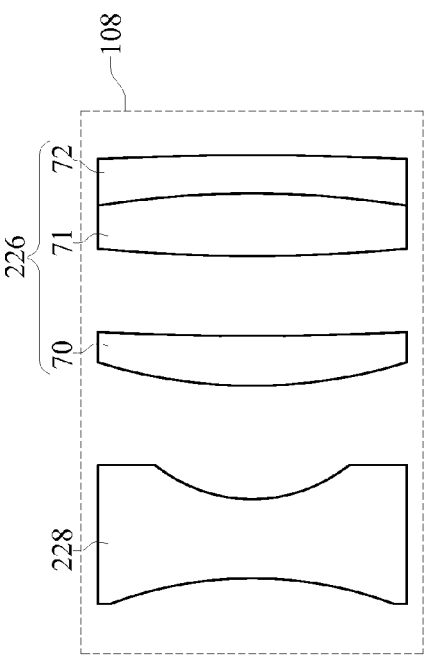
FIG. 4 is a schematic structural view of another embodiment of an imaging compensation unit in FIG. 1.

For example, FIG. 4 is a schematic structural view of another embodiment of an imaging compensation unit in FIG. 1. The imaging compensation unit 108 may comprise, but is not limited to, a positive lens group 226 and a negative lens group 228. The positive lens group 226 may comprise, but is not limited to, a lens 70, a lens 71, and a lens 72, and the negative lens group 228 may be, but is not limited to, a single concave lens. The negative lens group 228 is used for shortening the distance between the reflecting element 107 and the detection unit 110.

In this embodiment, as the aberration may comprise axial color aberration, lateral color aberration, and field curvature, to eliminate the aberration by the laser scanning device 100, the relationship between the imaging compensation unit 108 and the scanning focusing unit 114 needs to satisfy the following formulas:

$$OO' = \left(2 - m - \frac{1}{m} f'\right) \quad (3)$$

$$K = K' + K'' - dK'K'' \quad (4)$$

$$h_1 K = h_1 K_1 + h_2 K_2 + h_3 K_3 + h_4 K_4 + h_5 K_5 + h_6 K_6 \quad (5)$$

$$\frac{K_1}{n_1} + \frac{K_2}{n_2} + \frac{K_3}{n_3} + \frac{K_4}{n_4} + \frac{K_5}{n_5} + \frac{K_6}{n_6} = 0 \quad (6)$$

$$\frac{h_1^2 K_1}{V_1} + \frac{h_2^2 K_2}{V_2} + \frac{h_3^2 K_3}{V_3} + \frac{h_4^2 K_4}{V_4} + \frac{h_5^2 K_5}{V_5} + \frac{h_6^2 K_6}{V_6} = 0 \quad (7)$$

$$\frac{h_1 \bar{h}_1 K_1}{V_1} + \frac{h_2 \bar{h}_2 K_2}{V_2} + \frac{h_3 \bar{h}_3 K_3}{V_3} + \frac{h_4 \bar{h}_4 K_4}{V_4} + \frac{h_5 \bar{h}_5 K_5}{V_5} + \frac{h_6 \bar{h}_6 K_6}{V_6} = 0 \quad (8)$$

where OO' is an object-image distance (that is, a distance of the detection unit 110 from the object 51 through the scanner 104, the light splitting unit 106, the reflecting element 107, and the imaging compensation unit 108) of a total system (that is, the laser scanning device 100), m is a magnifying power of the total system (that is, the laser scanning device 100), f is an effective focal length of the total system, K, K', and K" are a focal power (the focal power is a reciprocal of the focal length) of the total system (that is, the laser scanning device 100), the imaging compensation unit 108, and the scanning focusing unit 114 respectively, and d is a distance between the imaging compensation unit 108 and the scanning focusing unit 114. $K_1$, $K_2$, $K_3$, $K_4$, $K_5$, and $K_6$ are focal powers of the lens 42, the lens 43, the lens 44, the lens 45, the positive lens group 126, and the negative lens group 128 respectively, $n_1$, $n_2$, $n_3$, $n_4$, $n_5$, and $n_6$ are refractive indexes of the lens 42, the lens 43, the lens 44, the lens 45, the positive lens group 126, and the negative lens group 128 respectively, $V_1$, $V_2$, $V_3$, $V_4$, $V_5$, and $V_6$ are dispersion coefficients of the lens 42, the lens 43, the lens 44, the lens 45, the positive lens group 126, and the negative lens group 128 respectively, and $h_1$, $h_2$, $h_3$, $h_4$, $h_5$, and $h_6$ are heights of an edge light (various wavelengths of the visible light beam 118) at the lens 42, the lens 43, the lens 44, the lens 45, the positive lens group 126, and the negative lens group 128 respectively.

Formula (3) is used to calculate the object-image distance of the total system (that is, the laser scanning device 100), Formulas (4) and (5) are used to calculate the focal power of the total system (that is, the laser scanning device 100), Formula (6) is used to calculate when there is no field curvature and the Petzval sum is zero, Formula (7) is used to calculate when there is no axial color aberration, and Formula (8) is used to calculate when there is no lateral color aberration.

Through Formulas (3), (4), (5), (6), (7), and (8), the relation formulas of $K_1$, $K_2$, $K_3$, $K_4$, $K_5$, $K_6$ and the lenses (that is, the lens 42, the lens 43, the lens 44, the lens 45, the positive lens group 126, and the negative lens group 128) of the total system (that is, the laser scanning device 100) can be available when there is no aberration. Some parameters in the relation formulas may be set according to requirements of actual laser processing, to obtain exact values of all the parameters, which will not be described any more herein. It should be noted that, the positive lens group 126 and the negative lens group 128 still need to satisfy Formulas (1) and (2).

It should be noted that when a imaging of the object 51 is defocused by the laser scanning device 100 (that is, the positioning point A and the positioning point C), one of the positions of the detection unit 110, the negative lens group 128, and the positive lens group 126 is adjusted to make the imaging of the object 51 focused and the laser scanning device 100 can obtain a clear image of the object 51.

In addition, because a magnifying power of the positioning point B is different from that of the positioning point A (that is, the magnifying power of the positioning point B is smaller than that of the positioning point A), a distance between the negative lens group 128 and the positive lens group 126 is adjusted. According to formula (3), the effective focal length (f') of the laser scanning device 100 has to be changed to make the magnifying power of the laser scanning device 100 be fixed. According the following formula (9):

$$\frac{1}{f'} = \frac{1}{f_1} + \frac{1}{f_2} - \frac{d}{f_1 f_2} \quad (9)$$

Where $f_1$ is a focal length of the negative lens group 128, $f_2$ is a focal length of the positive lens group 126, and d is a distance between the negative lens group 128 and the positive lens group 126.

Since the focal length of the negative lens group 128 and the focal length of the positive lens group 126 are fixed, the distance between the negative lens group 128 and the positive lens group 126 has to be changed to make the effective focal length (f') of the laser scanning device 100 be changed. That is to say, when the laser scanning device 100 scans the object 51 from the positioning point B to the positioning point A, a distance between the negative lens group 128 and the positive lens group 126 is adjusted according to a disposition of the object 51.

In this embodiment, the detection unit 110 receives the visible light beam 118 that passes through the imaging compensation unit 108 and outputs a detection signal 120. The control unit 112 receives the detection signal 120, and adjusts the detection signal 120 according to the wavelength of the visible light beam 118, the wavelength of the laser beam 116, the scanning focusing unit 114, and the imaging compensation unit 108.

That is to say, the detection unit 110 receives the visible light beam 118 that passes through the imaging compensation unit 108 and outputs the detection signal 120, to provide a result that a production line (not shown) detecting the object 51 after the scanning process. However, as the wavelengths of the visible light beam 118 and the laser beam 116 are different, a deviation exists between the output detection signal 120 and the image on the real object 51. Therefore, the control unit 112 may adjust the detection signal 120 output by the detection unit 110 according to the wavelength of the visible light beam 118, the wavelength of the laser beam 116, the scanning focusing unit 114, and the imaging compensation unit 108, to eliminate the deviation, so as to improve the detection accuracy.

Figure 5:
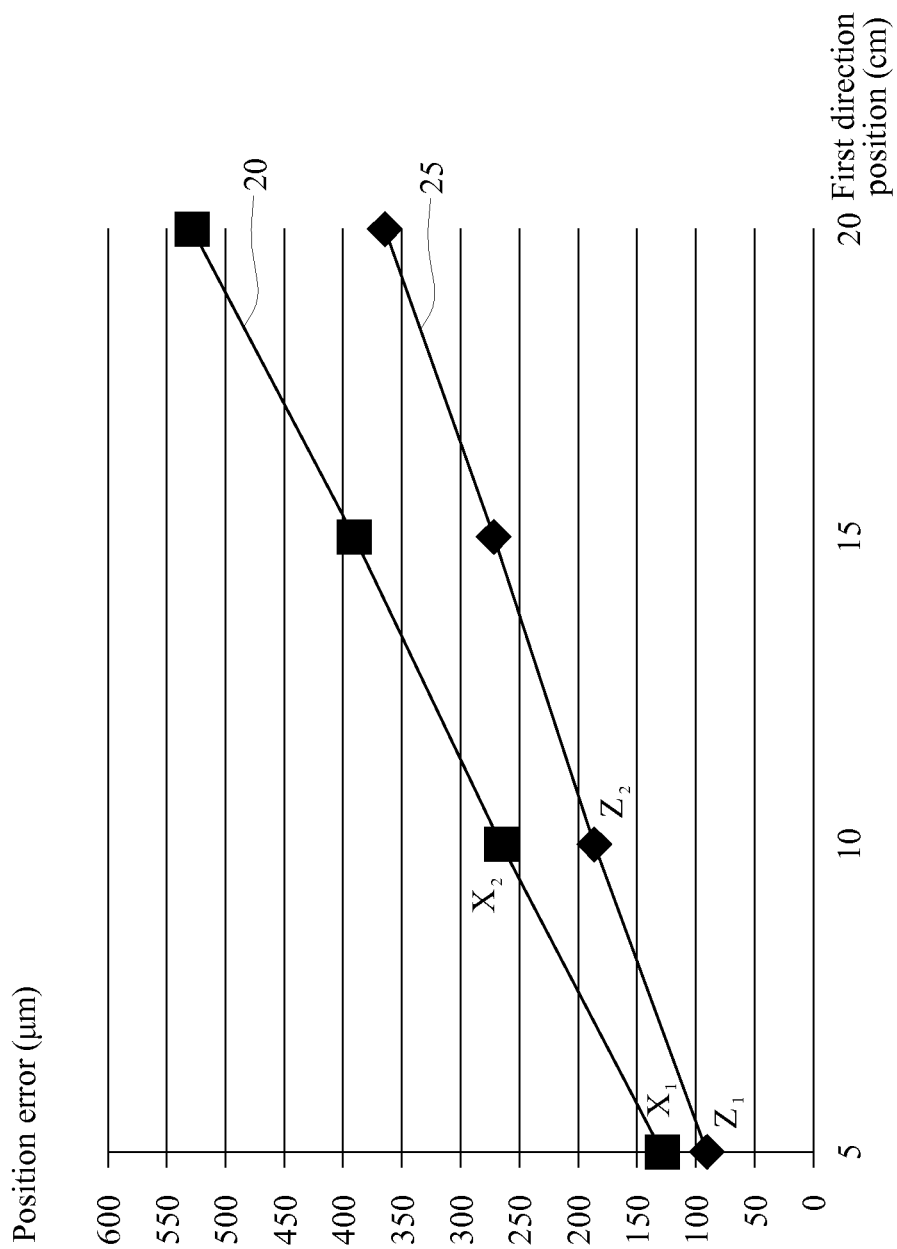
FIG. 5 is a schematic view illustrating a relationship of position errors of optical simulation and actual operation in a first direction in a control unit in FIG. 1.
Figure 6:
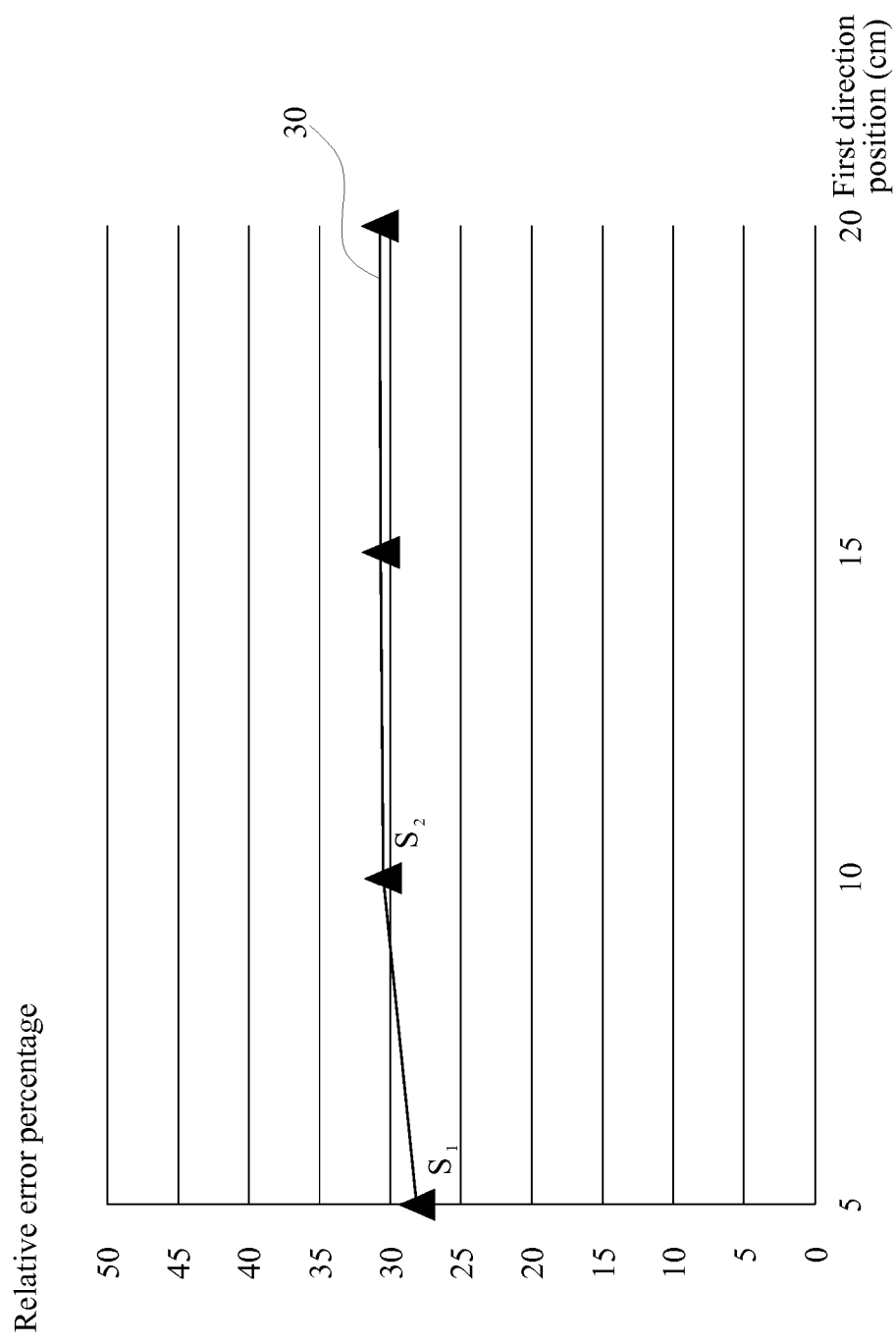
FIG. 6 is a schematic view illustrating a relationship of relative error percentages of the optical simulation and the actual operation in FIG. 5.

For more detailed descriptions, reference can be made to FIGS. 1, 5, and 6. FIG. 5 is a schematic view illustrating a relationship of position errors of optical simulation and actual operation in a first direction of the control unit in FIG. 1, and FIG. 6 is a schematic view illustrating a relationship of relative error percentages of the optical simulation and the actual operation in FIG. 5. As the scanning performed by the laser scanning device 100 is two-dimensional laser scanning, that is, the scanning direction comprises a first direction (not shown) and a second direction (not shown), and the first direction is perpendicular to the second direction, when the detection unit 110 detects the object 51 after the scanning process, position errors in the first direction and the second direction are generated. In this embodiment, the position error in the first direction is taken as an example, and the position error in the second direction may be obtained in the same manner.

In order to avoid the deviation between the image on the real object 51 and the output detection signal 120 generated by the detection unit 110 due to the difference between the wavelengths of the visible light beam 118 and the laser beam 116, before the laser scanning device 100 performs the laser processing, the control unit 112 firstly performs a simulation procedure according to the wavelength of the visible light beam 118, the wavelength of the laser beam 116, the scanning focusing unit 114 (that is, the radiuses of curvature and the refractive indexes of the lens 42, the lens 43, the lens 44, and the lens 45), and the imaging compensation unit 108 (that is, the radiuses of curvature and the refractive indexes of the positive lens group 126 and the negative lens group 128), and outputs a simulation signal 20 at different first direction positions (that is, the position error of the optical simulation at different first direction positions), then the laser scanning device 100 performs an actual operation procedure to enable the control unit 112 to obtain an actual operation signal 25 at different first direction positions (that is, the position error of the actual operation at different first direction positions), and thus the control unit 112 calculates the relative error with the simulation signal 20 at different first direction positions and the actual operation signal 25 at different first direction positions, to obtain an error signal 30. For example, a value $Z_1$ in the actual operation signal 25 is first subtracted from a value $X_1$ in the simulation signal 20, and the result is divided by $X_1$, to obtain a value $S_1$ in the error signal 30; a value $Z_2$ in the actual operation signal 25 is subtracted from a value $X_2$ in the simulation signal 20, and the result is divided by $X_2$, to obtain a value $S_2$ in the error signal 30, and the rest can be obtained in the same manner.

In this embodiment, the control unit 112 may perform linear regression computation with the error signal 30 to obtain a deviation value, and feed back the deviation value to the scanner 104 and the scanning focusing unit 114 for compensation, so as to compensate the deviation caused due to the difference of the wavelengths of the visible light beam 118 and the laser beam 116. It should be noted that, the calibration compensation is not limited to be performed once, and may be repeated according to the precision required by the process. After the calibration compensation is completed, the laser scanning device 100 may perform a precise scanning process. In this embodiment, the deviation value may be, but is not limited to, 5 µm.

The simulation procedure comprises the following steps. The laser scanning device 100 is simulated to perform engraving in the first direction by using the scanner 104 and the scanning focusing unit 114, in which the engraving in the first direction may be, but is not limited to, three-point engraving, and after the engraving in the first direction, each engraving point is spaced from each other by a relative distance P (the distance between the engraving points is a fixed value). Next, the detection unit 110 is simulated to perform imaging and visual positioning of each engraving point along the first direction by using the imaging compensation unit 108, to obtain a relative distance S between the points. Then, the relative distance P of the engraving points after the simulation of the engraving in the first direction is compared with the relative distance S of the points obtained by the simulation with the imaging compensation unit 108 along the first direction, to obtain an error, and the error is the simulation signal 20 at different first direction positions.

The actual operation procedure comprises the following steps. The laser scanning device 100 performs engraving in the first direction by using the scanner 104 and the scanning focusing unit 114 which have no scanning processing error (that is, the scanner 104 and the scanning focusing unit 114 after calibration compensation), in which the engraving in the first direction may be, but is not limited to, three-point engraving, and each engraving point is spaced from each other by a relative distance A (the distance between the engraving points is a fixed value). Next, the detection unit 110 performs imaging and visual positioning of each engraving point along the first direction by using the imaging compensation unit 108, to obtain a relative distance B between the points. Then, the relative distance A of the engraving points after the engraving in the first direction is compared with the relative distance B of the points obtained by using the imaging compensation unit 108 along the first direction, to obtain an error, and the error is the actual operation signal 25 at different first direction positions.

The lens 42, the lens 43, the lens 44, the lens 45, the lens 60, the lens 61, the lens 62, the lens 63, the lens 70, the lens 71, the lens 72, and the single concave lens included in the negative lens group 228 may be, but are not limited to, spherical lenses, aspheric lenses, or doublet lenses.

Figure 7A:
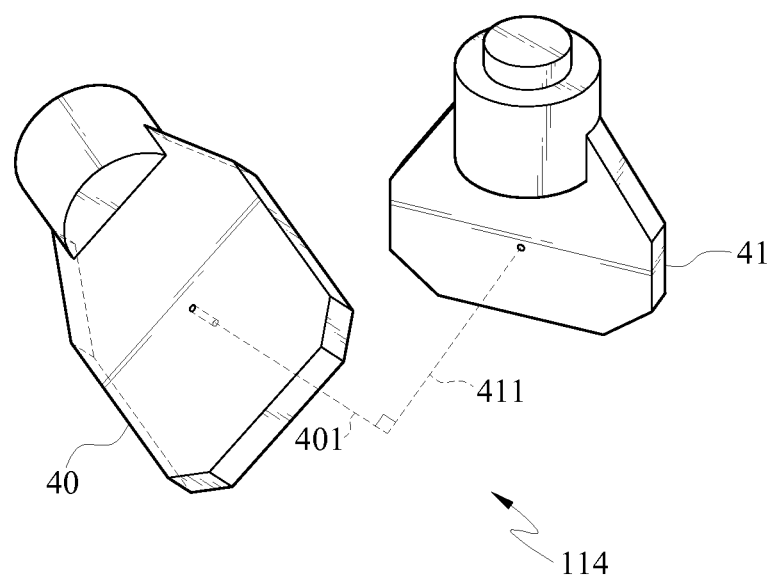
FIG. 7A is a three-dimensional structural view of an embodiment of a scanning focusing unit in FIG. 1.
Figure 7B:
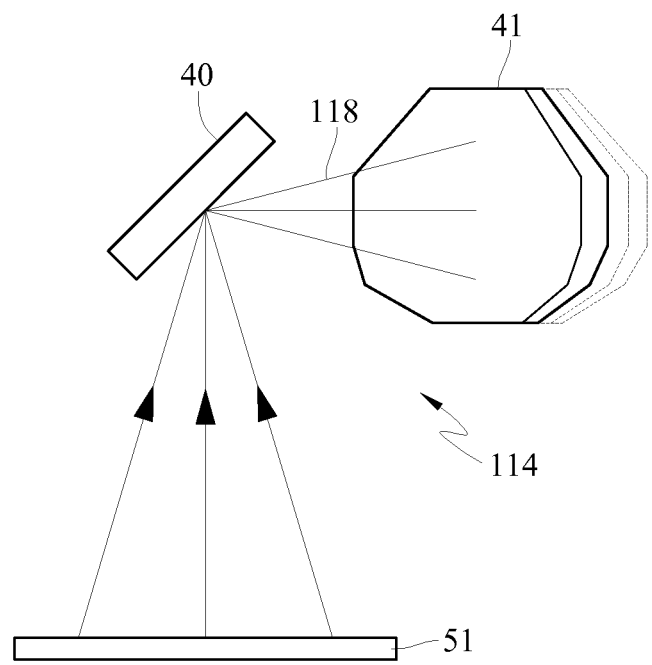
FIG. 7B is a side structural view of an embodiment of a scanning focusing unit in FIG. 1.
Figure 7C:
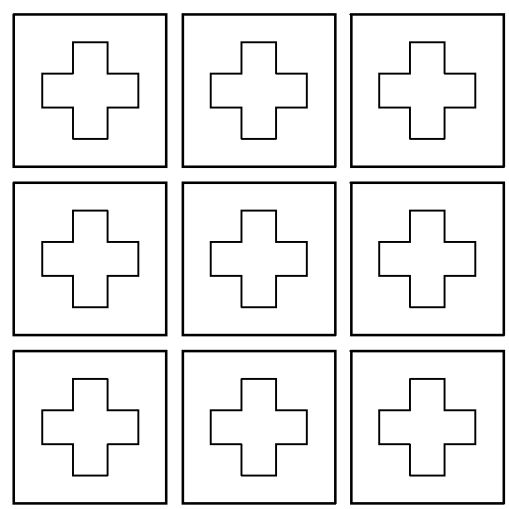
FIG. 7C is a schematic view of an embodiment of an image of a scanning area obtained by the detection unit in FIG. 1 via the scanning focusing unit in FIG. 7A.
Figure 8A:
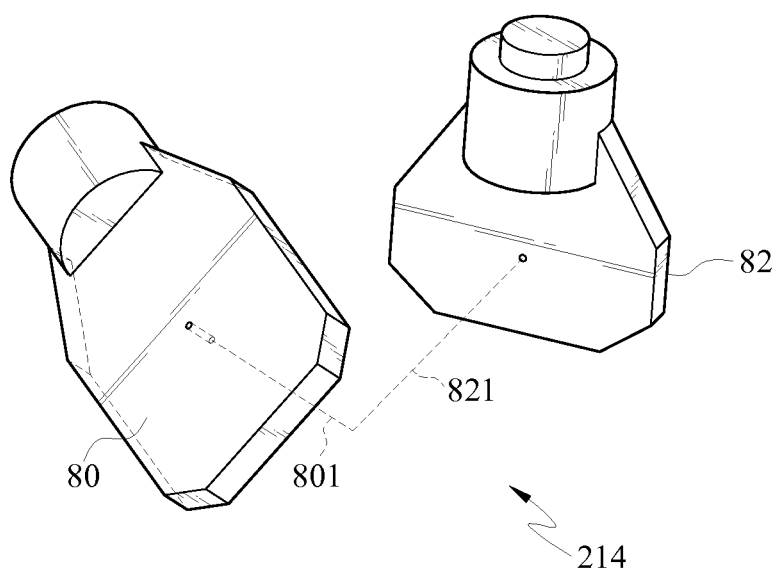
FIG. 8A is a three-dimensional structural view of an embodiment of a conventional scanning focusing unit.
Figure 8B:
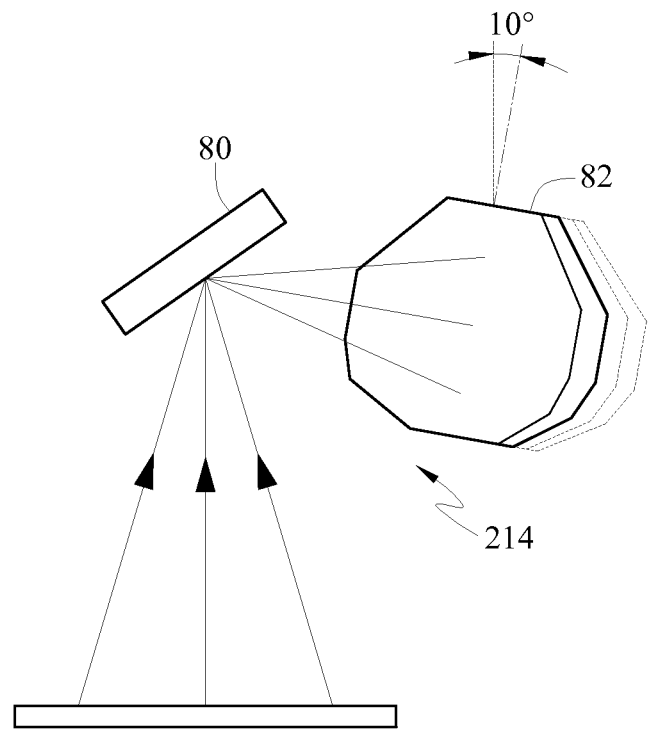
FIG. 8B is a side structural view of an embodiment of a conventional scanning focusing unit.
Figure 8C:
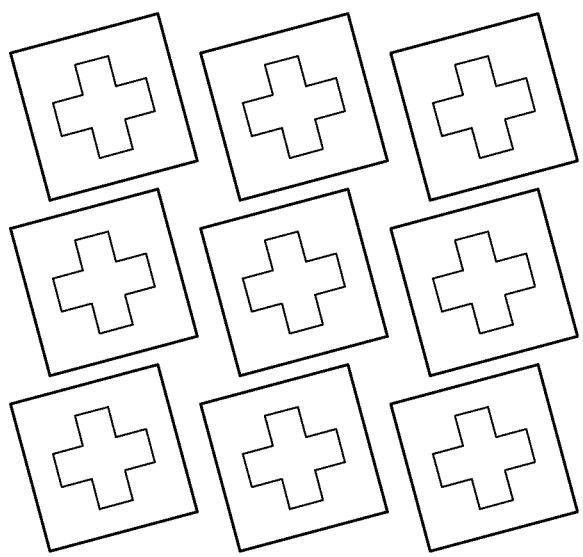
FIG. 8C is a schematic view of an embodiment of an image of a scanning area obtained by the conventional laser scanning and detecting device via the conventional scanning focusing unit.

FIG. 7A is a three-dimensional structural view of an embodiment of a scanning focusing unit in FIG. 1, and FIG. 7B is a side structural view of an embodiment of a scanning focusing unit in FIG. 1. In this embodiment, referring to FIGS. 7A and 7B, the scanning focusing unit 114 includes a scanning element 40 and a scanning element 41, the scanning element 40 has a normal line 401, the scanning element 41 has a normal line 411, and the normal line 401 and the normal line 411 are perpendicular to one another. The laser scanning device 100 can use the normal line 401 and the normal line 411 which are perpendicular to one another to solve the problem that the conventional laser scanning and detecting device obtains a rotation image of the scanning area since a normal line 801 of a scanning element 80 and a normal line 821 of a scanning element 82 of a conventional scanning focusing unit 214 are not perpendicular to one another (referring to FIGS. 8A, 8B and 8C, wherein FIG. 8A is a three-dimensional structural view of an embodiment of a conventional scanning focusing unit, FIG. 8B is a side structural view of an embodiment of a conventional scanning focusing unit, and FIG. 8C is a schematic view of an embodiment of an image of a scanning area obtained by conventional laser scanning and detecting device via the conventional scanning focusing unit), thereby improving the accuracy of positioning and the accuracy of detecting of the laser scanning device 100 (referring to FIG. 7C which is a schematic view of an embodiment of an image of a scanning area obtained by the detection unit in FIG. 1 via the scanning focusing unit in FIG. 7A).

According to the laser scanning device of the present invention, the detection unit is disposed to solve the problems in the prior art that many components are needed, a large space is occupied, and synchronous detection cannot be achieved. Next, as the scanning focusing unit is designed according to the laser beam, and the wavelengths of the visible light beam and the laser beam are different, when the visible light beam passes through the scanning focusing unit, the aberration (comprising the field curvature, the axial color aberration, and the lateral color aberration) is caused. With the design of the imaging compensation unit, the aberration caused when the visible light beam passes through the scanning focusing unit is compensated, thus solving the problem in the prior art that merely images at the central region are clear. Moreover, as the visible light beam comprises multiple wavelengths, when the visible light beam passes through the scanning focusing unit and the imaging compensation unit, the dispersion is caused. By adjusting the detection signal through the control unit, the dispersion caused after the visible light beam passes through the scanning focusing unit and the imaging compensation unit is compensated, thus solving the problem in the prior art that the position actually scanned by the laser beam is different from the scanning processing position where the CCD receives the visible light beam to obtain the image, which affects the detection accuracy. Moreover, the laser scanning device of the present invention can use the two normal lines of the two scanning elements which are perpendicular to one another to solve the problem that the conventional laser scanning and detecting device obtains a rotation image of the scanning area since the two normal lines of the two scanning element of the conventional scanning focusing unit are not perpendicular to one another, thereby improving the accuracy of positioning and the accuracy of detecting of the laser scanning device of the present invention.

What is claimed is:

1. A laser scanning device, comprising:
   a laser output unit for outputting a laser beam;
   a light source for irradiating a visible light beam to an object, the object reflecting the visible light beam;
   a scanner comprising a scanning focusing unit for focusing the laser beam to scan the object, wherein the scanner receives the visible light beam from the object and outputs the visible light beam through the scanning focusing unit;
   a light splitting unit for letting the laser beam pass therethrough and reflecting the visible light beam output by the scanner;
   an imaging compensation unit for receiving the visible light beam reflected by the light splitting unit, wherein the visible light beam is focused for imaging after passing through the imaging compensation unit, and the imaging compensation unit compensates for an aberration caused when the visible light beam passes through the scanning focusing unit;
   a detection unit for receiving the visible light beam that passes through the imaging compensation unit and outputting a detection signal; and
   a control unit for receiving the detection signal and adjusting the detection signal according to a radius of curvature and a refractive index of the scanning focusing unit, a radius of curvature and a refractive index of the imaging compensation unit, and a wavelength of the visible light beam.

2. The laser scanning device according to claim 1, wherein a wavelength of the laser beam is 100 nanometers (nm) to 100 micrometers (μm).

3. The laser scanning device according to claim 1, wherein the scanning focusing unit comprises at least one scanning element and at least one lens.

4. The laser scanning device according to claim 1, wherein the imaging compensation unit comprises at least one positive lens group.

5. The laser scanning device according to claim 4, wherein the at least one positive lens group satisfies a following formula:

$$r_2 - r_1 > r_1 \cdot r_2$$

where $r_1$ is a first radius of curvature of the at least one positive lens group, and $r_2$ is a second radius of curvature of the at least one positive lens group.

6. The laser scanning device according to claim 4, wherein the at least one positive lens group is selected from a group consisting of a spherical lens, an aspheric lens, a doublet lens, and a combination thereof.

7. The laser scanning device according to claim 5, wherein the imaging compensation unit further comprises at least one negative lens group.

8. The laser scanning device according to claim 7, wherein the at least one negative lens group satisfies the following formula:

$$r_3 - r_4 \leq r_3 \cdot r_4$$

where $r_3$ is a third radius of curvature of the at least one negative lens group, and $r_4$ is a fourth radius of curvature of the at least one negative lens group.

9. The laser scanning device according to claim 7, wherein when an imaging of the object is defocused by the laser scanning device, one of a position of the detection unit, a position of the at least one negative lens group, and a position of the at least one positive lens group is adjusted to make the imaging of the object focused.

10. The laser scanning device according to claim 7, wherein a distance between the at least one negative lens group and the at least one positive lens group is adjusted according to a position of the object.

11. The laser scanning device according to claim 1, wherein the detection unit is a charge couple device (CCD).

12. The laser scanning device according to claim 1, wherein the control unit outputs a simulation signal according to the wavelength of the visible light beam, a wavelength of the laser beam, and a relationship between the scanning focusing unit and the imaging compensation unit, the laser scanning device performs an actual operation procedure to enable the control unit to obtain an actual operation signal, the control unit calculates a relative error with the simulation signal and the actual operation signal to obtain an error signal, and the control unit adjusts the detection signal according to the error signal.

13. The laser scanning device according to claim 1, wherein the object is disposed on a working platform, and the laser scanning device scans the object on the working platform.

14. The laser scanning device according to claim 1, wherein the scanning focusing unit includes two scanning elements, and each of the two scanning elements has a normal line, the normal lines are perpendicular to one another.

* * * * *